(12) United States Patent
Holcomb et al.

(10) Patent No.: US 9,071,847 B2
(45) Date of Patent: *Jun. 30, 2015

(54) VARIABLE CODING RESOLUTION IN VIDEO CODEC

(75) Inventors: Thomas W. Holcomb, Bothell, WA (US); Chih-Lung Lin, Redmond, WA (US); Sridhar Srinivasan, Redmond, WA (US); Pohsiang Hsu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3017 days.

This patent is subject to a terminal disclaimer.

(21) Appl. No.: 10/960,356

(22) Filed: Oct. 6, 2004

(65) Prior Publication Data

US 2006/0072672 A1 Apr. 6, 2006

(51) Int. Cl.
*H04N 7/12* (2006.01)
*H04N 11/02* (2006.01)
*H04N 11/04* (2006.01)
*H04N 19/59* (2014.01)
*H04N 19/176* (2014.01)
*H04N 19/70* (2014.01)
*H04N 19/46* (2014.01)
(Continued)

(52) U.S. Cl.
CPC .............. *H04N 19/59* (2014.11); *H04N 19/176* (2014.11); *H04N 19/70* (2014.11); *H04N 19/46* (2014.11); *H04N 19/107* (2014.11); *H04N 19/136* (2014.11); *H04N 19/152* (2014.11); *H04N 19/156* (2014.11); *H04N 19/164* (2014.11); *H04N 19/177* (2014.11); *H04N 19/174* (2014.11); *H04N 19/179* (2014.11); *H04N 19/80* (2014.11)

(58) Field of Classification Search
CPC . H04N 19/107; H04N 19/186; H04N 19/152; H04N 19/156; H04N 19/164
See application file for complete search history.

(56) References Cited

U.S. PATENT DOCUMENTS 5,300,949 A   4/1994  Rodriquez et al.
5,414,469 A   5/1995  Gonzales et al.
(Continued)

FOREIGN PATENT DOCUMENTS

EP   1 401 211   3/2004
EP   1 617 672   1/2006
(Continued)

OTHER PUBLICATIONS

Anonymous, "DivX Multi Standard Video Encoder," 2 pp.
(Continued)

*Primary Examiner* — Nhon Diep
(74) *Attorney, Agent, or Firm* — Miia Sula; Judy Yee; Micky Minhas

(57) ABSTRACT

A video codec provides for encoding and decoding pictures of a video sequence at various coded resolutions, such that pictures can be encoded at lower coded resolutions based on bit rate or other constraints while maintaining a consistent display resolution. The video codec employs a coding syntax where a maximum coded resolution is signaled at the sequence level of the syntax hierarchy, whereas a lower coded resolution is signaled at the entry point level for a segment of one or more intra-coded frames and frames predictively encoded based thereon. This allows the use of a separate out-of-loop resampler after the decoder to up-sample the pictures to the display resolution.

21 Claims, 10 Drawing Sheets

(51) Int. Cl.

| | |
|---|---|
| *H04N 19/107* | (2014.01) |
| *H04N 19/136* | (2014.01) |
| *H04N 19/152* | (2014.01) |
| *H04N 19/156* | (2014.01) |
| *H04N 19/164* | (2014.01) |
| *H04N 19/177* | (2014.01) |
| *H04N 19/174* | (2014.01) |
| *H04N 19/179* | (2014.01) |
| *H04N 19/80* | (2014.01) |

(56) References Cited

U.S. PATENT DOCUMENTS

| | | | |
|---|---|---|---|
| 5,565,920 | A | 10/1996 | Lee et al. |
| 5,611,038 | A | 3/1997 | Shaw et al. |
| 5,764,296 | A | 6/1998 | Shin |
| RE35,910 | E | 9/1998 | Nagata et al. |
| 5,821,986 | A * | 10/1998 | Yuan et al. ............. 348/14.12 |
| 5,828,421 | A | 10/1998 | Boyce et al. |
| 5,864,637 | A | 1/1999 | Liu et al. |
| 5,970,173 | A | 10/1999 | Lee et al. |
| 6,002,801 | A | 12/1999 | Strongin et al. |
| 6,014,694 | A * | 1/2000 | Aharoni et al. ............. 709/219 |
| 6,104,434 | A | 8/2000 | Nakagawa et al. |
| 6,157,396 | A * | 12/2000 | Margulis et al. ............. 345/506 |
| 6,239,847 | B1 | 5/2001 | Deierling |
| 6,259,741 | B1 | 7/2001 | Chen et al. |
| 6,324,301 | B1 | 11/2001 | Jacquin et al. |
| 6,339,434 | B1 | 1/2002 | West et al. |
| 6,418,166 | B1 | 7/2002 | Wu et al. |
| 6,456,663 | B1 | 9/2002 | Kim |
| 6,499,060 | B1 | 12/2002 | Wang et al. |
| 6,501,484 | B1 | 12/2002 | Porter |
| 6,510,177 | B1 | 1/2003 | De Bonet et al. |
| 6,600,785 | B1 | 7/2003 | Nishigori et al. |
| 6,728,317 | B1 | 4/2004 | Demos |
| 6,823,014 | B2 | 11/2004 | Kim |
| 6,937,291 | B1 | 8/2005 | Gryskiewicz |
| 7,039,115 | B1 * | 5/2006 | Wu ............. 375/240.26 |
| 7,079,157 | B2 | 7/2006 | Deering |
| 7,236,526 | B1 | 6/2007 | Kitamura |
| 7,375,767 | B2 | 5/2008 | Lee et al. |
| 7,379,496 | B2 | 5/2008 | Holcomb et al. |
| 7,756,350 | B2 | 7/2010 | Vos et al. |
| 7,822,123 | B2 | 10/2010 | Lin et al. |
| 7,839,933 | B2 | 11/2010 | Srinivasan et al. |
| 7,956,930 | B2 | 6/2011 | Sullivan |
| 8,638,862 | B2 | 1/2014 | Sun |
| 2002/0064226 | A1 | 5/2002 | Bauer et al. |
| 2002/0186890 | A1 | 12/2002 | Lee et al. |
| 2003/0161401 | A1 | 8/2003 | Shen et al. |
| 2003/0185306 | A1 | 10/2003 | MacInnis et al. |
| 2004/0013195 | A1 | 1/2004 | Panusopone et al. |
| 2004/0042549 | A1 | 3/2004 | Huang et al. |
| 2004/0062307 | A1 | 4/2004 | Hallapuro et al. |
| 2004/0091174 | A1 | 5/2004 | Wang et al. |
| 2004/0101058 | A1 | 5/2004 | Sasai et al. |
| 2004/0161035 | A1 | 8/2004 | Wedi |
| 2004/0208247 | A1 | 10/2004 | Barrau et al. |
| 2004/0213345 | A1 | 10/2004 | Holcomb et al. |
| 2005/0105611 | A1 | 5/2005 | Bjontegaard |
| 2005/0105617 | A1 | 5/2005 | Chono |
| 2005/0190867 | A1 | 9/2005 | Sobchak et al. |
| 2005/0196073 | A1 | 9/2005 | MacInnis et al. |
| 2005/0207496 | A1 | 9/2005 | Komiya et al. |
| 2006/0072673 | A1 | 4/2006 | Lin et al. |
| 2006/0093036 | A1 | 5/2006 | Park et al. |
| 2006/0104349 | A1 | 5/2006 | Joch et al. |
| 2006/0120614 | A1 | 6/2006 | Flierl et al. |
| 2006/0210185 | A1 | 9/2006 | Sun |
| 2006/0222083 | A1 | 10/2006 | Klein et al. |
| 2007/0098079 | A1 | 5/2007 | Boyce et al. |
| 2007/0160153 | A1 | 7/2007 | Sullivan |

FOREIGN PATENT DOCUMENTS

| | | |
|---|---|---|
| JP | 4-207684 | 7/1992 |
| JP | 2000-134618 | 5/2000 |
| JP | 2000-165661 | 6/2000 |
| JP | 2000-165866 | 6/2000 |
| JP | 2000-242774 | 9/2000 |
| JP | 2002-152498 | 5/2002 |
| RU | 2191469 | 10/2002 |
| SU | 1506554 | 9/1989 |
| WO | WO 98/41029 | 9/1998 |
| WO | WO 99/09748 | 2/1999 |
| WO | WO 00/33581 | 6/2000 |
| WO | WO 01/95633 | 12/2001 |
| WO | WO 02/054777 | 7/2002 |
| WO | WO 03/007619 | 1/2003 |
| WO | WO 2006/006777 | 1/2006 |
| WO | WO 2006/109135 | 10/2006 |
| WO | WO 2006/112620 | 10/2006 |

OTHER PUBLICATIONS

Catmull et al., "A Class of Local Interpolating Splines," Computer Aided Geometric Design, Academic Press, pp. 317-326 (1974).

Dufaux et al., "Abstract: Motion-compensated generic coding of video based on a multi resolution data structure," 2 pp. (1993) [downloaded from the World Wide Web on Jan. 25, 2006].

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Oct. 2005).

Keys, "Cubic Convolution Interpolation for Digital Image Processing," Computer Graphics, vol. ASSP-29, No. 6, pp. 1153-1160 (Dec. 1981).

Mitchell et al., "Reconstruction Filters in Computer Graphics," Computer Graphics, vol. 22, No. 4 pp. 221-228 (Aug. 1988).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Wien, "Variable Block-Size Transforms for Hybrid Video Coding," Dissertation, 182 pp. (Feb. 2004).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

(56) References Cited

OTHER PUBLICATIONS

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Brainard et al., "Composite Television Coding: Subsampling and Interpolation," *SMPTE Journal*, pp. 717-724 (Aug. 1982).

Einarsson et al., "Mixed Resolution Video Coding for Low Bit-Rate Channels," *Proc. Int'l Workshop on Coding Techniques for Very Low Bit-rate Video: VLBV97*, Linköping, Sweden, pp. 77-80 (Jul. 1997).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.)

Wedi, "Adaptive Interpolation Filter for Motion Compensated Hybrid Video Coding," *Picture Coding Symposium*, 4 pp. (Apr. 2001).

Wedi, "Adaptive Interpolation Filter for Motion Compensated Prediction," *IEEE*, 4 pp. (Dec. 2002).

Wedi, "Adaptive Interpolation Filters and High-Resolution Displacements for Video Coding," *IEEE Trans. on Circuits and Systems for Video Technology*, pp. 484-491 (Apr. 2006).

Beerman et al., "Low-complexity Spatial Up-scaling Methods for Low-resolution Video Coding," 6 pp. (2004).

Dufaux et al., "Motion-compensated generic coding of video based on a multi resolution data structure," Optical Engineering, vol. 32, No. 7, pp. 1559-1570 (Jul. 1993).

Meijering, A Chronology of Interpolation: From Ancient Astronomy to Modern Signal and Image Processing,: IEEE vol. 90, No. 3, pp. 319-342 (Mar. 2002).

Meijering, "Prolog to a Chronology of InterpolationL From Ancient Astronomy to Modern Signal and Image Processing," IEEE vol. 90, No. 3, pp. 317-318 (Mar. 2002).

Meijering et al., "A Note on Cubic Convolution Interpolation," IEEE Transactions on Image Processing, vol. 12, No. 4, pp. 477-479 (Apr. 2003).

Regunathan, "Flexible 4-tap Filters for Texture Upsampling in Spatial Scalability," JVT-U123, Hangzhou, China, 10 pp. (Oct. 2006).

Regunathan, "Flexible 4-tap Filters for Texture Upsampling in Spatial Scalability," JVT-V074, Marrakech, Morocco, 14 pp. (Jan. 2007).

Segall et al., "Adaptive Upsampling for Spatially Scalable Coding," JVT-O010, Busan, KR, 10 pp. (Apr. 2005).

Segall, "CE4: Evaluation of Texture Upsampling with 4-tap Cubic-Spline Filter," JVT-U042, Hangzhou, China, 6 pp. (Oct. 2006).

Srinivasan et al., "Windows Media Video 9: Overview and Applications," *Signal Processing: Image Communication*, vol. 19, No. 9, pp. 851-875 (Oct. 2004).

Sullivan, "Resampling Filters for SVC Upsampling," JVT-R066, Meeting: Bangkok, Thailand, 9 pp. (Jan. 2006).

Sun, "Texture Upsampling with 4-tap Cubic-Spline Filter," JVT-T057r1, Klagenfurt, Austria, 8 pp. (Jul. 2006).

Sun, "Upsampling Filter Design with Cubic Splines," JVT-S016, Geneva, Switzerland, 9 pp. (Mar.-Apr. 2006).

Tu et al., "CE4: 4-tap Motion Compensation Interpolation Filter for High Resolution SVC Enhancement Layers," JVT-W068, 9 pp. (Apr. 2007).

Volleberg et al., "Generic Topology for FIR Filter Based Up- and Down-Sampling," 4 pp. (Apr. 2004).

Sullivan, "Color Format Upconversion for Video Display," JVT-I019r2, San Diego, 6 pp. (Sep. 2003).

Sun, "Resampling Process for Interlaced Materials in SVC," JVT-Rxxx, Meeting: Bangkok, Thailand, 9 pp. (Jan. 2006).

\* cited by examiner

Software 980 Implementing Video
Encoder/Decoder With Variable Coding
Resolution

VARIABLE CODING RESOLUTION IN VIDEO CODEC

TECHNICAL FIELD

The present invention relates to techniques for digitally encoding, decoding and processing video, images and other digital media content.

BACKGROUND

Multiple resolution video encoding and decoding is described, inter alia, in Holcomb et al., "Multi-resolution Video Coding and Decoding," U.S. patent application Ser. No. 10/644,258, filed Aug. 19, 2003 (the disclosure of which is hereby incorporated herein by reference) [hereafter the '258 patent application]. In multi-resolution video encoding, the video encoder may adaptively change or lower the coded size of video frames within a video sequence relative to the displayed video size so as to reduce blocking artifacts at low bitrates (among other reasons). For video frames coded at lower resolution, the frame is down-sampled at the encoder to permit coding at a lower resolution, then up-sampled at the decoder to maintain a consistent display resolution. One implementation of the multiple resolution video encoding and decoding techniques described in this patent application is incorporated in simple and main coding profiles of the Windows Media Video version 9 (WMV-9) video codec distributed and licensed by Microsoft Corporation of Redmond, Wash., USA.

In the WMV-9 video codec's simple and main coding profiles, the video encoder communicates the coding resolution to the decoder using elements of the codec's bit stream syntax. In particular, the bit stream syntax includes a multi-resolution flag syntax element (labeled "MULTIRES") at the sequence header that indicates whether or not there could be resolution changes within the bit stream, and also includes a two-bit picture resolution syntax element (labeled "RESPIC") at the picture header to signal a reduction in resolution by a factor of two (i.e., reduction to one-half the display resolution) in the horizontal or vertical dimensions of the picture. The sequence header was carried at the level of the file container (e.g., the "ASF" format file container), externally from the encoded video bit stream contained therein.

SUMMARY

Various video codec tools and techniques described herein provide for variable coding resolution in an encoded video sequence that improves upon the prior multiple resolution video coding and decoding. This feature allows a decoder to maintain a consistent video display resolution, while providing an encoder with the flexibility to choose to encode some portion or portions of the video at an actual coded resolution lower than the display resolution. When desired to use the lower coding resolution, the encoder filters and down-samples the portions of the video content to the lower resolution. Upon receiving such lower resolution portions, the decoder filters and up-samples the decoded content for display at the display resolution. For example, it may be desirable for the encoder to code some portions of the video content at the lower coded resolution so that such portions can be represented at a lower encoded bit-rate than necessary to encode the picture at the full display resolution, or to save processing power by encoding a smaller picture.

In one implementation described herein, a video codec employs a coding syntax for the encoded video bit-stream that includes syntax elements to flexibly signal variable coding resolution for some portion of the pictures in the video sequence. The coding syntax includes syntax elements (labeled "MAX_CODED_WIDTH," and "MAX_CODED_HEIGHT," in this implementation) carried in a sequence header inside the video bit-stream, which specify the picture dimensions at the full display resolution. The coding syntax further includes syntax elements (a flag labeled "CODED_SIZE", and parameters labeled "CODED_WIDTH" and "CODED_HEIGHT," in this implementation) in an entry-point header of the video bit-stream. The "CODED_SIZE" flag indicates that the sub-sequence of pictures beginning at the entry point are coded at a lower coding resolution specified by the "CODED_WIDTH" and "CODED_HEIGHT" parameters. The entry point headers signal entry-points into the video bit-stream at which decoding can commence as described in Holcomb et al., "Signaling Valid Entry Points In A Video Stream," U.S. patent application Ser. No. 10/882,739, filed Jun. 30, 2004 [hereafter the "Entry-Point Patent Application"], and claiming priority to U.S. Provisional Patent Application No. 60/520,543, filed Nov. 13, 2003, the disclosures of which are hereby incorporated herein by reference.

This improved variable video coding resolution implementation has the advantage of carrying parameters that specify the dimensions of the display resolution within the video bit stream, and not merely in the file container. Further, the lower coding resolution for a portion of the video is signaled in this improved variable video coding resolution implementation at the entry point level. As discussed in the Entry-Point Patent Application, the entry points coincide with one or more sub-sequences or groups of pictures of the video sequence that begins with an intra-coded frame (also referred to as an "I-frame"), and also may contain one or more predictive-coded frames (also referred to as a "P-frame") that are predictively coded relative to that intra-coded frame. The lower coding resolution signaled at the entry point thus applies to a group of pictures that includes an I-frame and the P-frames that reference the I-frame. By signaling the lower coding resolution for such groups of pictures, the decoder can then avoid resampling "within the loop." In other words, the resolution of a reconstructed I-frame need not be resampled to the resolution of the P-frames that reference it, in order to decode the P-frames. This further allows the use of a separate out-of-loop resampler after the decoder to up-sample the pictures to the display resolution.

Additional features and advantages of the invention will be made apparent from the following detailed description of embodiments that proceeds with reference to the accompanying drawings.

DETAILED DESCRIPTION

The following description is directed to implementations of an improved variable coding resolution technique that permits portions of a video sequence to be variably coded at lower resolutions. An exemplary application of this technique is in a video codec system. Accordingly, the variable coding resolution technique is described in the context of an exemplary video encoder/decoder utilizing an encoded bit stream syntax. In particular, one described implementation of the improved variable coding resolution technique is in a video codec that complies with the advanced profile of the VC-9 video codec standard. Alternatively, the technique can be incorporated in various video codec implementations and standards that may vary in details from the below described exemplary video codec and syntax.

1. Video Source, Coding and Communication System

Figure 1:
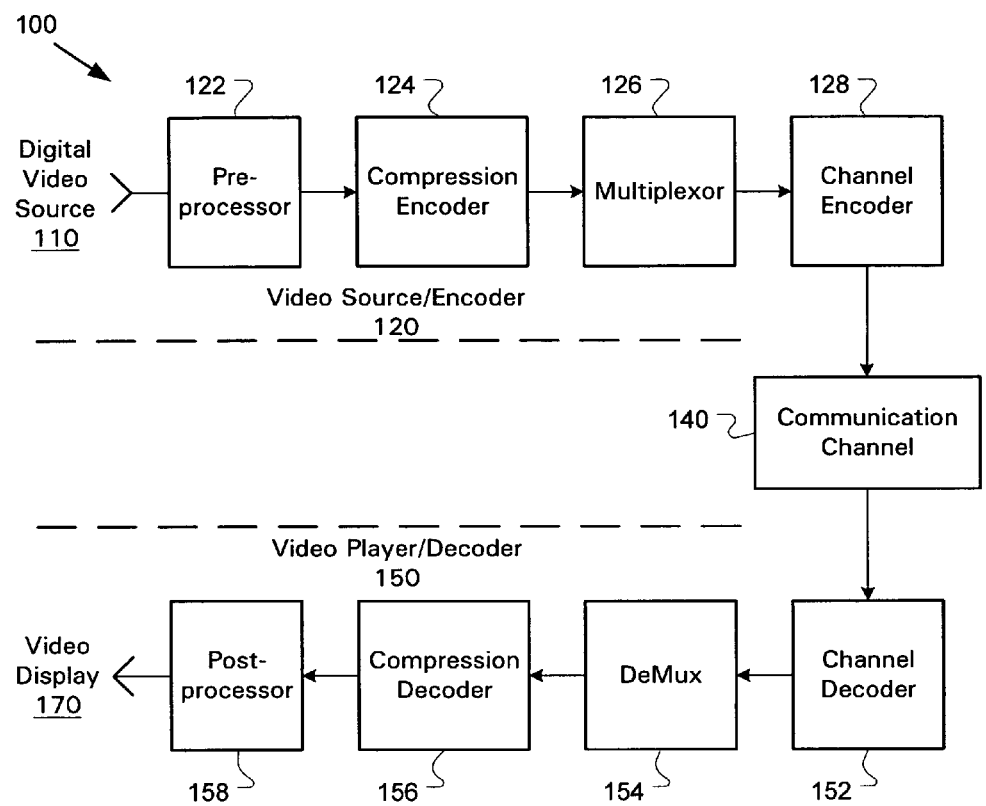
FIG. 1 is a block diagram of a video codec incorporating an improved variable coding resolution technique described herein.

FIG. 1 illustrates deployment of a video capture and playback system 100 employing a video codec in which the variable coding resolution technique is implemented in a typical application or use scenario. The video capture and playback system 100 generally includes a video source/encoder 120 that captures and encodes video content from an input digital video source 110 into a compressed video bit stream on a communication channel 140, and a video player/decoder 150 that receives and decodes the video from the channel and displays the video on a video display 170. Some examples of such systems in which the below described video codec with variable coding resolution can be implemented encompass systems in which the video capture, encoding, decoding and playback are all performed in a single machine, as well as systems in which these operations are performed on separate, geographically distant machines. For example, a digital video recorder (or personal computer with a TV tuner card) can capture a video signal and encode the video to hard drive, as well as read back, decode and display the video from the hard drive on a monitor. As another example, a commercial publisher or broadcaster of video can use a video mastering system incorporating the video encoder to produce a video transmission (e.g., a digital satellite channel, or Web video stream) or a storage device (e.g., a tape or disk) carrying the encoded video, which is then used to distribute the video to user's decoder and playback machines (e.g., personal computer, video player, video receiver, etc.).

In the illustrated system 100, a video source/encoder 120 includes a source pre-processor 122, a source compression encoder 124, a multiplexor 126 and a channel encoder 128. The pre-processor 122 receives uncompressed digital video from a digital video source 110, such as a video camera, analog television capture, or other sources, and processes the video for input to the compression encoder 124. The compression encoder 124 (such as the video encoder 200 of FIG. 2 described below) performs compression and encoding of the video, as discussed below. The mutliplexor 126 delivers the resulting compressed video bit stream to the channel encoder 128 for encoding onto the communication channel 140. The communication channel can be a video transmission (e.g., digital television broadcast, satellite or other over-the-air transmission; or cable, telephone or other wired transmission), recorded video media (e.g., computer hard drive or other storage disk; tape, optical disk (DVD) or other removable recorded medium). The channel encoder 128 encodes the compressed video bit stream into a file container, transmission carrier signal or the like.

At the video player/decoder 150, a channel decoder 152 decodes the compressed video bit stream on the communication channel. A demultiplexor 154 delivers the compressed video bit stream from the channel decoder to a compression decoder 156 (such as the video decoder 300 of FIG. 3, described below). The compression decoder then decodes and reconstructs the video from the compressed video bit stream. Finally, the post-processor 158 processes the video to be displayed on a video display 170.

2. Generalized Video Encoder and Decoder

Figure 2:
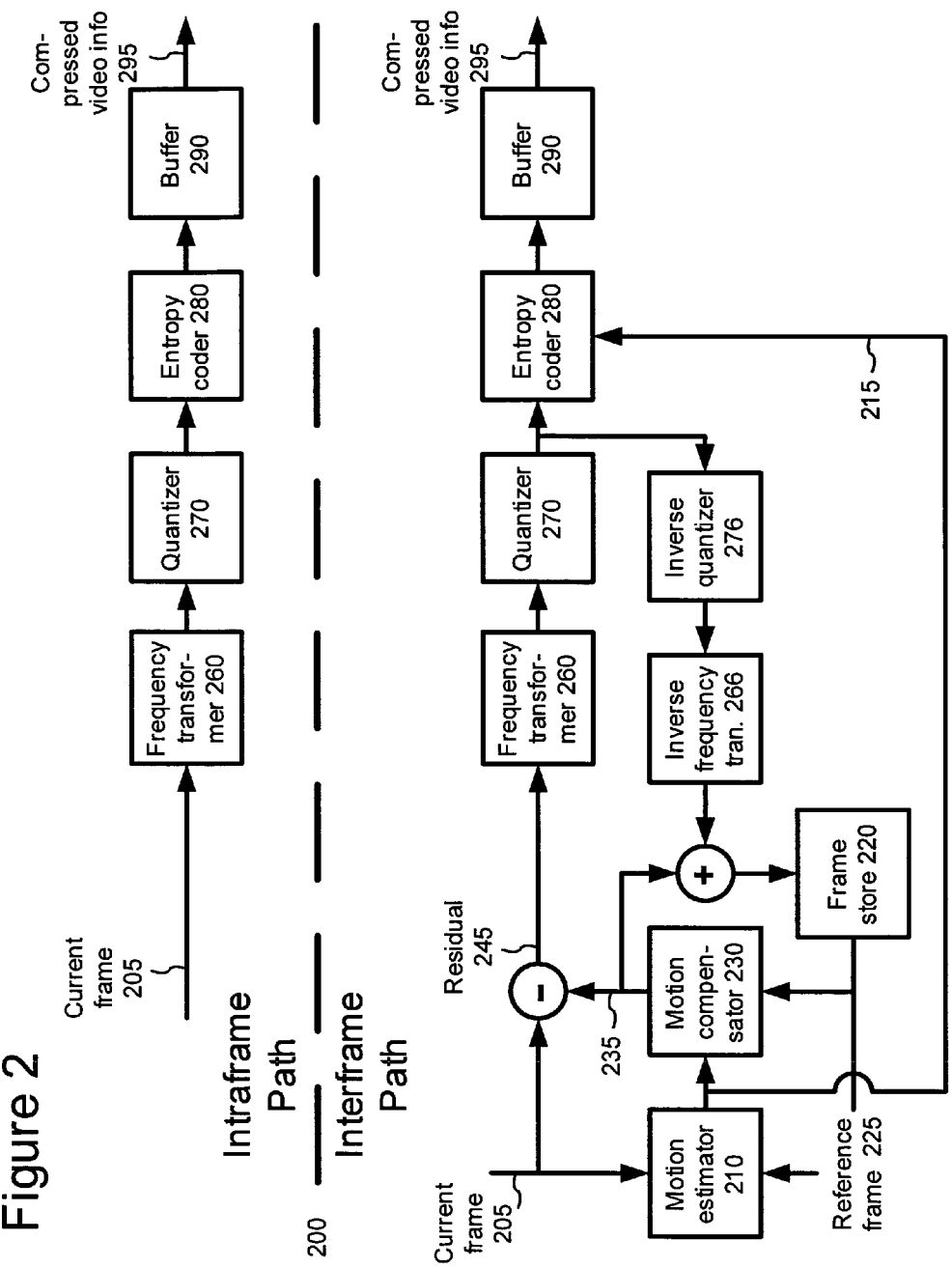
FIG. 2 is a block diagram of a video encoder in the video codec of FIG. 1.
Figure 3:
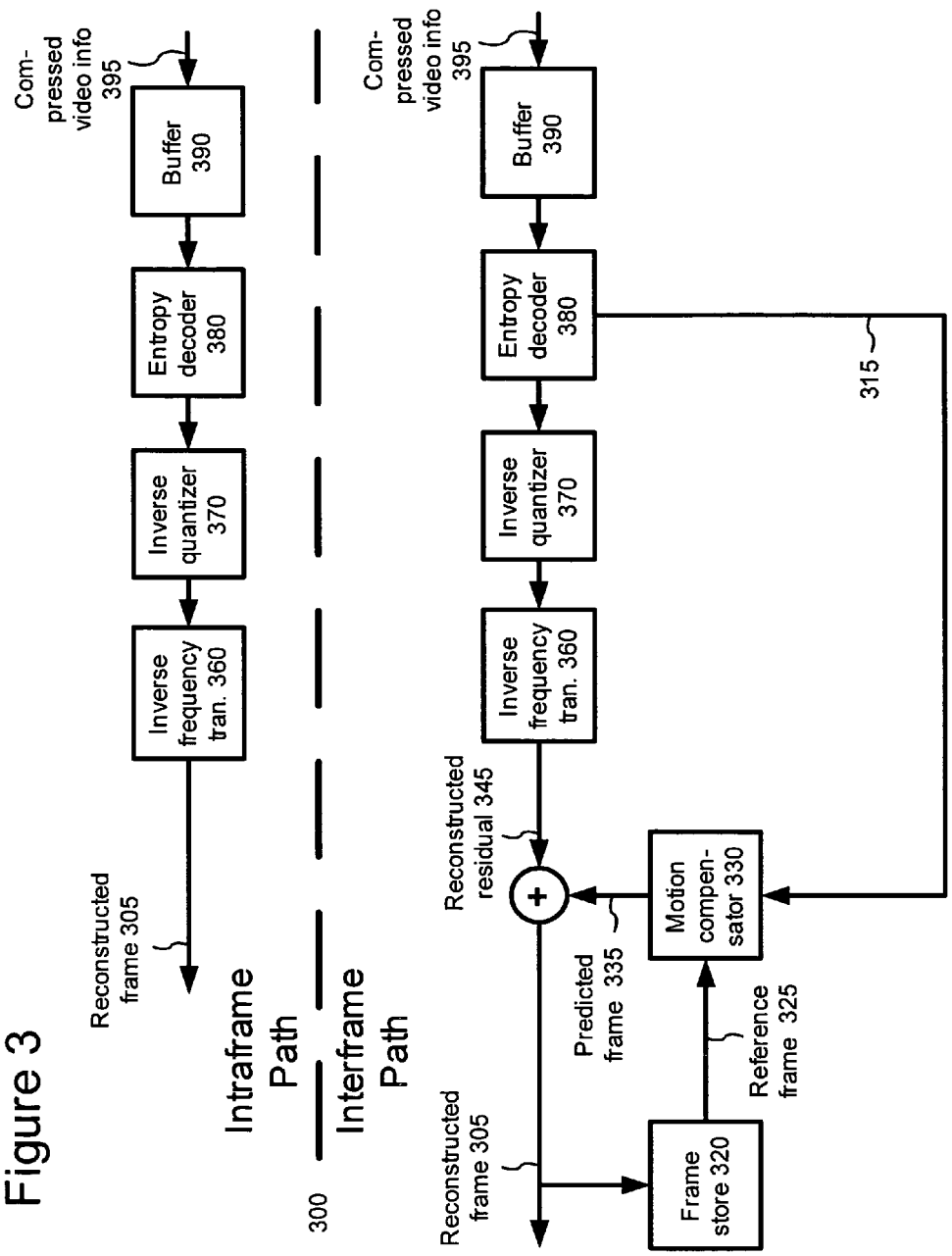
FIG. 3 is a block diagram of a video decoder in the video codec of FIG. 1.

FIG. 2 is a block diagram of a generalized video encoder (200) and FIG. 3 is a block diagram of a generalized video decoder (300), in which the variable coding resolution technique can be incorporated.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (200) and decoder (300) are block-based and use a 4:2:0 macroblock format with each macroblock including 4 luminance 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system (200). The encoder system (200) receives a sequence of video frames including a current frame (205), and produces compressed video information (295) as output. Particular embodiments of video encoders typically use a variation or supplemented version of the generalized encoder (200).

The encoder system (200) compresses predicted frames and key frames. For the sake of presentation, FIG. 2 shows a path for key frames through the encoder system (200) and a path for forward-predicted frames. Many of the components of the encoder system (200) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) outputs as side information motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

A frequency transformer (260) converts the spatial domain video information into frequency domain (i.e., spectral) data. For block-based video frames, the frequency transformer (260) applies a transform described in the following sections that has properties similar to the discrete cosine transform ["DCT"]. In some embodiments, the frequency transformer (260) applies a frequency transform to blocks of spatial prediction residuals for key frames. The frequency transformer (260) can apply an 8×8, 8×4, 4×8, or other size frequency transforms.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame. If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. In some embodiments, the encoder applies a deblocking filter to the reconstructed frame to adaptively smooth discontinuities in the blocks of the frame.

The entropy coder (280) compresses the output of the quantizer (270) as well as certain side information (e.g., motion information (215), quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bitrate adaptive modules. The compressed video information (295) is depleted from the buffer (290) at a constant or relatively constant bitrate and stored for subsequent streaming at that bitrate. Alternatively, the encoder system (200) streams compressed video information immediately following compression.

Before or after the buffer (290), the compressed video information (295) can be channel coded for transmission over the network. The channel coding can apply error detection and correction data to the compressed video information (295).

B. Video Decoder

FIG. 3 is a block diagram of a general video decoder system (300). The decoder system (300) receives information (395) for a compressed sequence of video frames and produces output including a reconstructed frame (305). Particular embodiments of video decoders typically use a variation or supplemented version of the generalized decoder (300).

The decoder system (300) decompresses predicted frames and key frames. For the sake of presentation, FIG. 3 shows a path for key frames through the decoder system (300) and a path for forward-predicted frames. Many of the components of the decoder system (300) are used for compressing both key frames and predicted frames. The exact operations performed by those components can vary depending on the type of information being compressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the frame (305) being reconstructed. For example, the motion compensator (330) uses a macroblock motion vector to find a macroblock in the reference frame (325). A frame buffer (320) stores previous reconstructed frames for use as reference frames. Alternatively, a motion compensator applies another type of motion compensation. The prediction by the motion compensator is rarely perfect, so the decoder (300) also reconstructs prediction residuals.

When the decoder needs a reconstructed frame for subsequent motion compensation, the frame store (320) buffers the reconstructed frame for use in predicting the next frame. In some embodiments, the encoder applies a deblocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse transform described in the following sections. In some embodiments, the inverse frequency transformer (360) applies an inverse frequency transform to blocks of spatial prediction residuals for key frames. The inverse frequency transformer (360) can apply an 8×8, 8×4, 4×8, or other size inverse frequency transforms.

2. Variable Coding Resolution

As discussed in the summary section above, the variable coding resolution technique permits the decoder to maintain a consistent video display resolution, while allowing the encoder the flexibility to choose to encode some portion or portions of the video at an actual coded resolution lower than the display resolution. The encoder can code some pictures of the video sequence at lower coded resolutions to achieve a lower encoded bit-rate than would be required to encode the picture at the full display resolution, or to save processing power by encoding a smaller picture. When desired to use the lower coding resolution, the encoder filters and down-samples the picture(s) to the lower resolution. At decoding, the decoder filters and up-samples the decoded content for display at the display resolution.

As described more fully below, the encoder 200 specifies the maximum resolution in a sequence header within the compressed video bit stream 295 (FIG. 2). In one coding syntax implementation described herein, the maximum resolution is specified using a MAX_CODED_WIDTH and MAX_CODED_HEIGHT syntax elements in the sequence header. Coding the maximum resolution in the sequence header of the video bit stream (as compared to header information carried outside the bit stream, such as in header information of a container file format, or transmission carrier format) has the advantage that the maximum resolution is directly decodable by the video decoder. The maximum resolution does not have to be separately passed to the video decoder by the container file or transmission carrier decoder (e.g., channel decoder 152).

The encoder 200 further signals that a group of one or more pictures following an entry point in the video bit-stream is coded at a lower resolution using a flag (e.g., a CODED_SIZE_FLAG syntax element described below) in the entry point header. If this flag indicates a lower coding resolution, the coded size is also coded in the entry point header (using CODED_WIDTH and CODED_HEIGHT syntax elements described below). By signaling a lower coding resolution for the group at the entry point level, the codec can avoid a need for the decoder to resample within the video decoding loop. More particularly, intra-coded frames (I-frames) in the group following an entry point header are coded at the same coded resolution as predicted frames in the group. In this way, the I-frame(s) need not be re-sampled to decode the predicted frames whose decoding depend upon such I-frame(s).

The separate coded width and coded height elements also permit the encoder to more flexibly specify coding resolutions. For example, the coded resolution is not limited to being one half the width and/or height of the display resolution, as in the simple and main coding profiles of the WMV-9 video codec discussed in the background section above.

3. Syntax Structure

Figure 4:
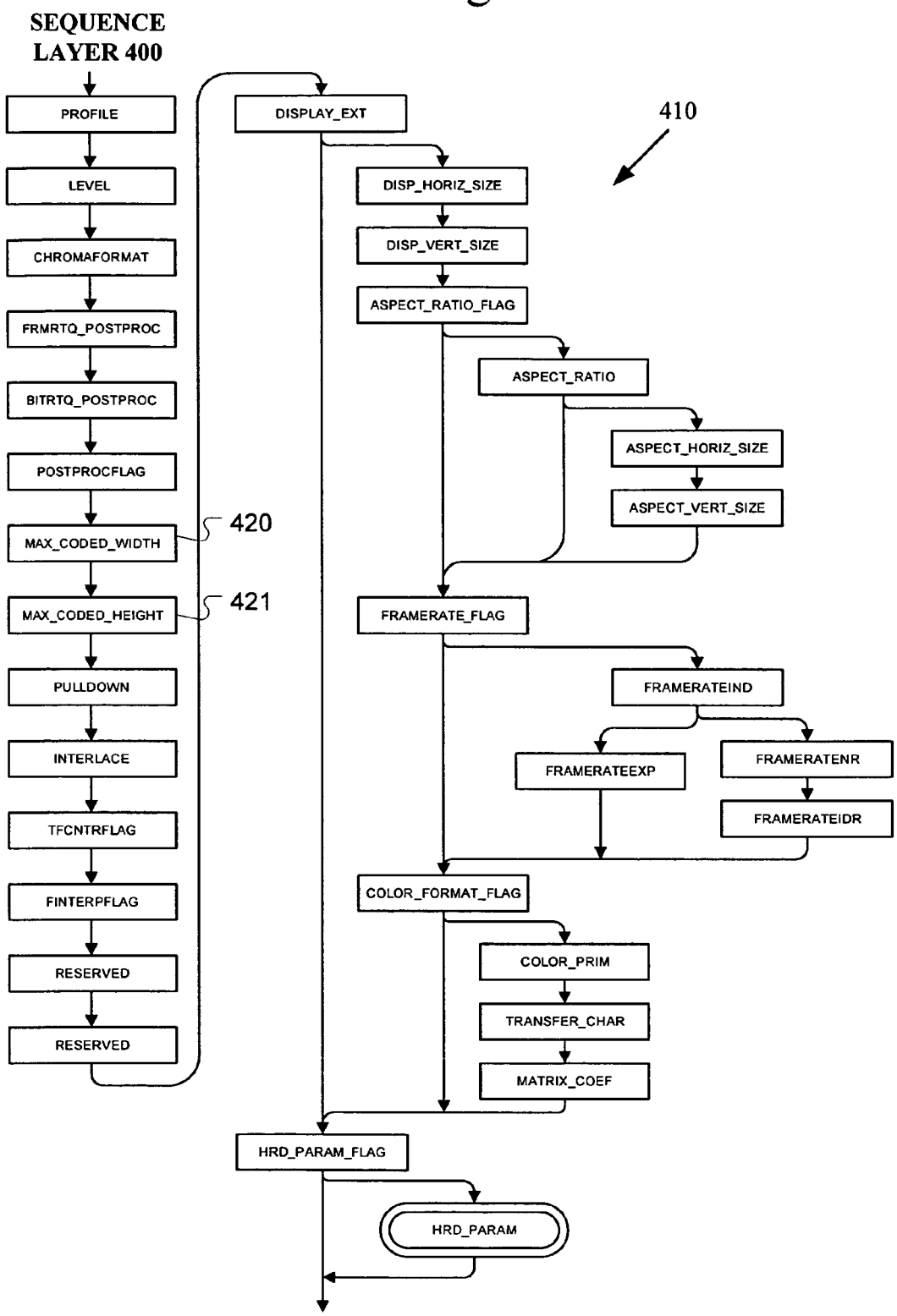
FIG. 4 is a syntax diagram of a sequence header in accordance with a coding syntax of the compressed bitstream utilized by the video encoder/decoder employing variable coding resolution.
Figure 5:
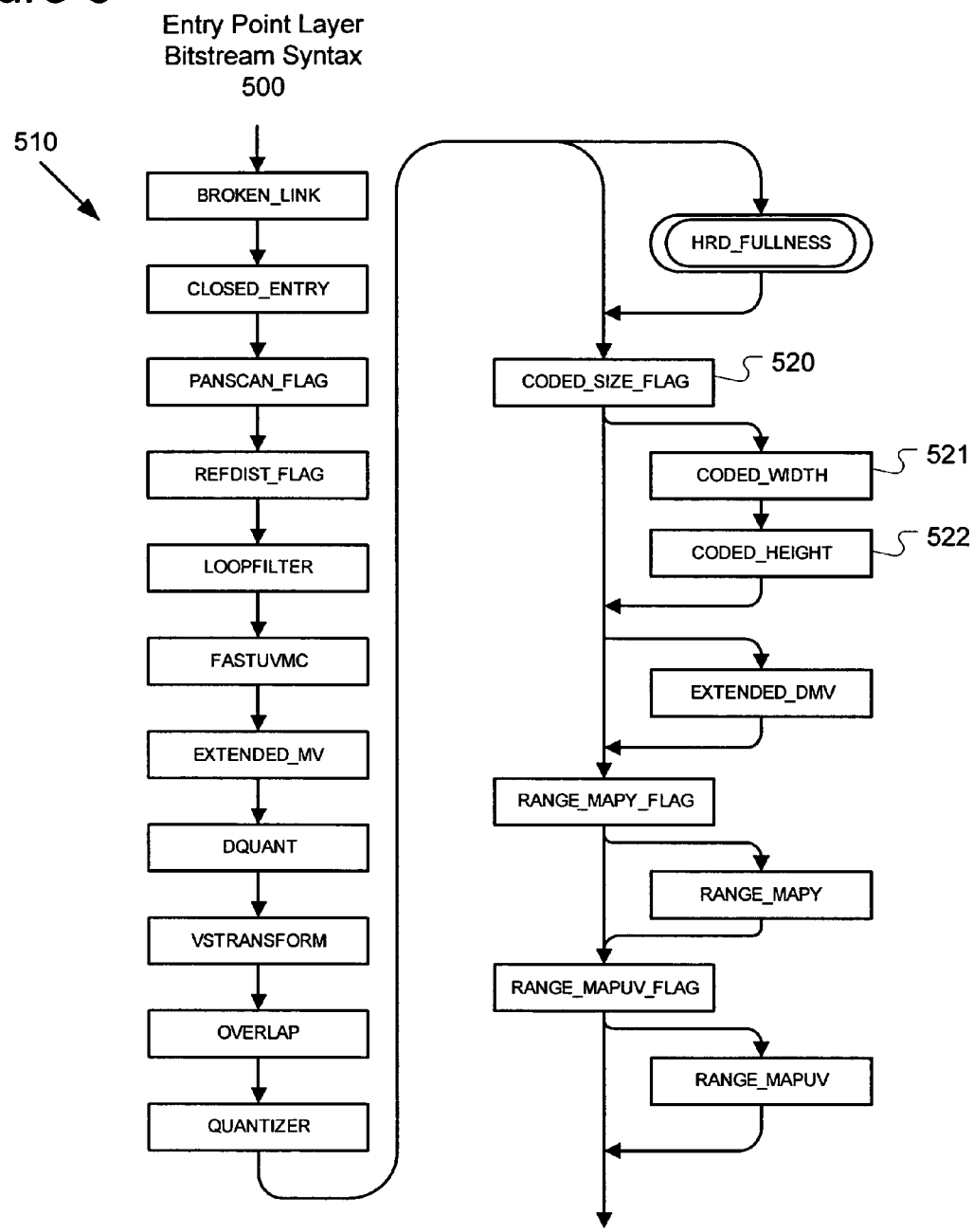
FIG. 5 is a syntax diagram of an entry point header in accordance with a coding syntax of the compressed bitstream utilized by the video encoder/decoder employing variable coding resolution.

With reference to FIGS. 4 and 5, the compressed video bitstream 295 (FIG. 2) includes information for a sequence of compressed progressive video frames or other pictures (e.g., interlace frame or interlace field format pictures). The bitstream is organized into several hierarchical layers that are decoded by a decoder such as the decoder (300) of FIG. 3. The highest layer is the sequence layer, which has information for the overall sequence of frames. Additionally, each compressed video frame is made up of data that is structured into three hierarchical layers: picture, macroblock, and block (from top to bottom). Alternative video implementations employing the variable coding resolution technique can utilize other syntax structures having various different compositions of syntax elements.

Further, the compressed video bit stream can contain one or more entry points. As discussed more fully in the Entry-Point Patent Application, valid entry points in a bitstream are locations in an elementary bitstream from which a system (e.g., a receiver, a video splicer, a commercial insertion tool, a video editor, a summarization engine, etc.) can decode or process the bitstream without the need of any preceding information (bits) in the bitstream. Frames that can be decoded without reference to preceding frames are typically referred to as "key" frames.

An entry point is signaled in a bitstream by an entry point indicator. The purpose of an entry point indicator is to signal the presence of a special location in a bitstream to begin or resume decoding (e.g., where there is no dependency on past decoded video fields or frames to decode the video frame following immediately the entry point indicator). Entry point indicators can be inserted at regular or irregular intervals in a bitstream. Therefore, an encoder can adopt different policies to govern the insertion of entry point indicators in a bitstream.

FIG. 4 is a syntax diagram for the sequence layer 400, which includes a sequence header 410 followed by data for the picture layer 500 (see FIG. 5). The sequence header 410 includes several sequence-level elements that are processed by the decoder and used to decode the sequence. The elements that make up the sequence header 410 include a maximum coded width (MAX_CODED_WIDTH) element 420, and a maximum coded height (MAX_CODED_HEIGHT) element 421, among others.

The MAX_CODED_WIDTH element 420 specifies the maximum horizontal size of the coded picture within the sequence. In the illustrated implementation, this syntax element is a 12-bit binary encoding of sizes. The maximum horizontal size of the picture is equal to the value of this field multiplied by 2, plus 2. The horizontal size of the coded pictures in the video sequence may change at an entry point but is always less than, or equal to, MAX_CODED_WIDTH. Alternative implementations can utilize a maximum coded width syntax element having a different size and/or specifying the maximum horizontal size in a different way.

The MAX_CODED_HEIGHT element 421 specifies the maximum vertical size of the coded picture within the video sequence. In the illustrated implementation, this syntax element is a 12-bit binary encoding of sizes. The maximum vertical size of the picture is equal to the value of this field multiplied by 2, plus 2. The vertical size of the coded pictures in the video sequence may change at an entry point but is always less than, or equal to, MAX_CODED_HEIGHT. Alternative implementations can utilize a maximum coded height syntax element having a different size and/or specifying the maximum vertical size in a different way.

FIG. 5 is a syntax diagram for the entry point layer 500. The entry point layer 500 includes an entry point header 510 followed by data for a group of pictures forming an entry point segment. The entry point header 510 includes several entry point-level elements that are processed by the decoder and used to decode the following picture frames without reference to preceding picture data in the video sequence. The elements that make up the entry point header include a coded size flag (CODED_SIZE_FLAG) element 520, a coded width (CODED_WIDTH) element 521, and a coded height (CODED_HEIGHT) element 522, among others.

The CODED_SIZE_FLAG signals a different coded resolution for pictures in the entry point segment. In the illustrated implementation, the CODED_SIZE_FLAG element 520 is a 1-bit syntax element. A value of one (CODED_SIZE_FLAG=1) indicates that the CODED_WIDTH and CODED_HEIGHT syntax elements are also present in the entry header. Otherwise, a flag value of zero (CODED_SIZE_FLAG=0) indicates that the CODED_WIDTH and CODED_HEIGHT syntax elements are not present in the entry header; and the width and height of the frames within the entry point segment are specified by the MAX_CODED_WIDTH and MAX_CODED_HEIGHT syntax elements in the sequence header. Alternative implementations can utilize a different format flag or value to signal a group of pictures in the video sequence has a different coded size.

The CODED_WIDTH element 521 specifies the coded horizontal size of pictures in the entry point segment. In the illustrated implementation, the CODED_WIDTH element 521 is a 12 bit syntax element that is present if CODED_SIZE_FLAG=1. It specifies the coded width of the frames within the entry point segment in units of 2 pixels. The coded width of the frames within the entry point segment is equal to the value of this field multiplied by 2, plus 2. Therefore, the range is 2 to 8192. Alternative implementations can use a different syntax element format to signal the coded horizontal picture size.

Similarly, the CODED_HEIGHT element 522 specifies the coded vertical size of pictures in the entry point segment. The CODED_HEIGHT element is a 12 bit syntax element that is present if CODED_SIZE_FLAG=1. It specifies the coded height of the frames within the entry point segment in units of 2 pixels. The coded height of the frames within the entry point segment is equal to the value of this field multiplied by 2, plus 2. Therefore, the range is 2 to 8192. Alternative implementations can use a different syntax element format to signal the coded vertical picture size.

3. Encoding with Variable Coded Resolution

Figure 6A:
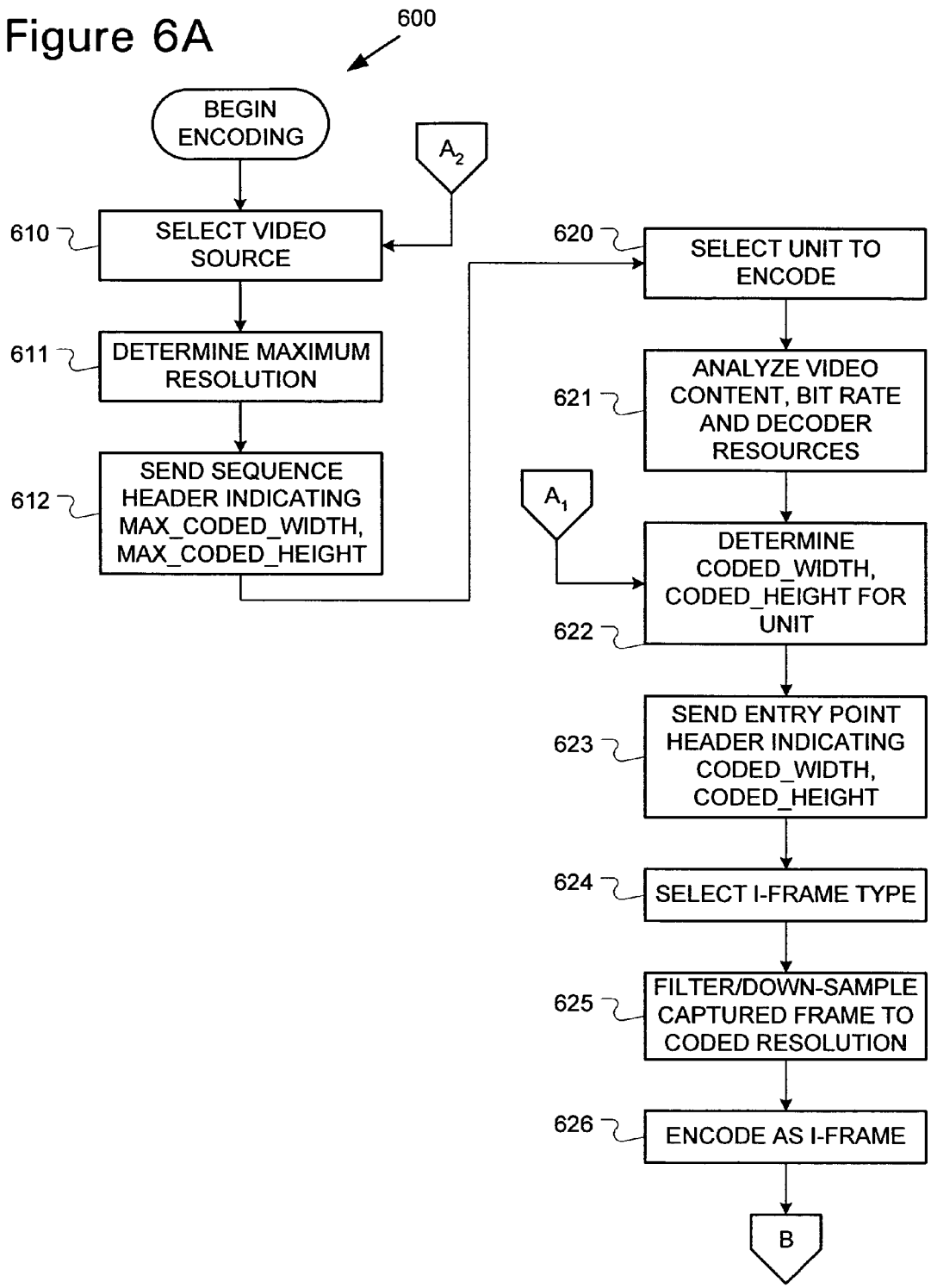
FIGS. 6A-B are a flow diagram of a method utilized in the encoder of FIG. 2 for encoding a video sequence using variable coding resolution.
Figure 6B:
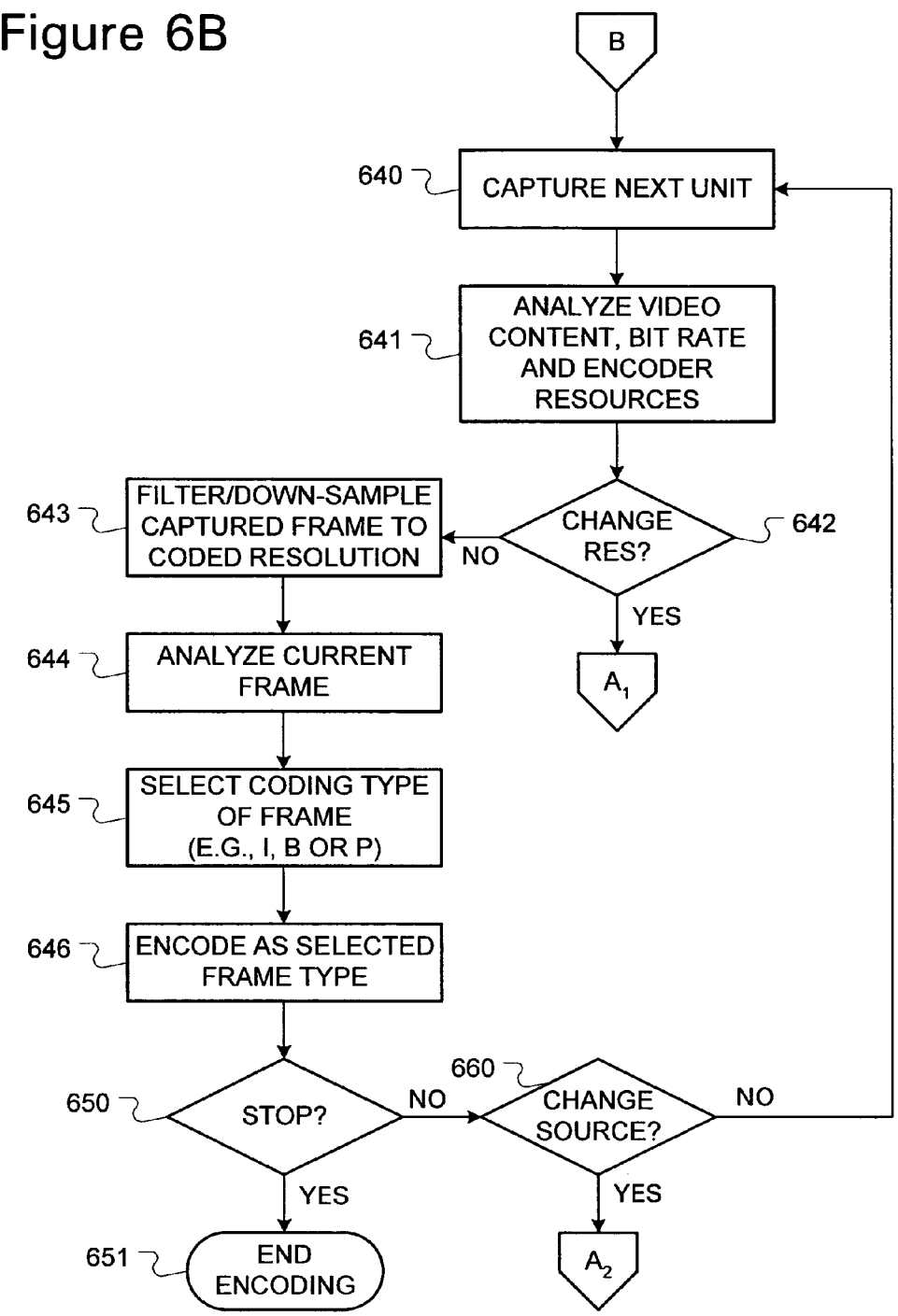

FIGS. 6A-B show operations performed in the compression encoder 124 (FIG. 1) to encode a video sequence using variable coded resolution. The illustrated encoding process is simplified to show those operations directly involved in the variable coded resolution technique. However, it should be understood to those skilled in the art that compression encoding of the video sequence involves many more operations as generally summarized above for the exemplary video encoder 200 (FIG. 2). Alternative implementations of the compression encoder can perform the variable coded resolution using fewer, more or a different arrangement of operations.

In the illustrated variable coded resolution encoding process 600, the compression encoder begins operation by selecting a source of the video content to be encoded (e.g., a camera or other digital video input) at operation 610. At operation 611, the compression encoder then determines a maximum resolution to use in encoding the video content, such as by determining the source resolution of the video, by determining the maximum decoding capability of the target decoder, or other determination basis. The compression encoder then sends the sequence header for the compressed video bit stream, including the MAX_CODED_WIDTH and MAX_CODED_HEIGHT elements indicating this maximum coding resolution at operation 612.

At operation 620, the compression encoder selects a unit of the video content to encode (e.g., a single frame, but alternatively other independently encodable units of the video content can be used, such as a slice or other partial picture unit, or group of multiple pictures). The encoding order need not be the same as received from the video source (e.g., when B-frame re-ordering is used). However, for ease of explanation, such re-ordering techniques are not further detailed.

The compression encoder analyzes the content of the unit to be encoded, the available bit rate of the communication channel 140 (FIG. 1), and the computational resources available in the encoder for encoding the unit at operation 621. At operation 622, the compression encoder determines a coded resolution for the unit based on this analysis. For example, the encoder can determine to lower the coded resolution for encoding the unit when the available bit rate is low, the nature of the content cannot be compressed as effectively without perceptible loss of quality, and/or the available encoding resources is temporarily reduced. In alternative implementations, the encoder's determination of the coded resolution can be based on fewer or additional analyses than these. At operation 623, the compression encoder then sends an entry point header containing a CODED_SIZE flag to indicate the presence of the CODED_WIDTH and CODED_HEIGHT elements, along with the CODED_WIDTH and CODED_HEIGHT elements specifying the coded resolution for the unit.

The compression encoder then proceeds to encode the unit, by selecting the I-frame coding type for the picture (operation 624), filtering and down-sampling the picture to the coded resolution (operation 625), and encoding the down-sampled picture as the selected I-frame coding type.

The compression encoder continues by capturing or acquiring a next unit of video from the source at operation 640. The compression encoder again analyzes the video content, available bit rate and encoder computational resources at operation 641. Based on these analyses, the compression encoder determines if the coded resolution needs to be changed. Again, alternative implementations may vary in the analyses upon which this determination is based. If the coded resolution is to change, the compression encoder returns to the determination of a new coded resolution for this next unit at operation 622. Otherwise, the compression encoder proceeds to encode the next unit by filtering and down-sampling the picture to the coded resolution (operation 643), analyzing the current frame (operation 644) and selecting an appropriate coding type (e.g., I-frame, B-frame or P-frame) for the frame (operation 645), and encoding the down-sampled frame as the selected type.

The compression encoder then checks whether the encoding process should cease (e.g., based on user input) at operation 650. If so, the compression encoder ends the compressed video bit stream and ceases the encoding operation.

If the encoding is to continue, the compression encoder further checks whether the source of video input is to change at operation 660. If so, the compression encoder loops to selecting the video source at operation 610.

Otherwise, the compression encoder continues to capture and encode the next unit of the video sequence at operation 640.

4. Decoding with Variable Coded Resolution

Figure 7:
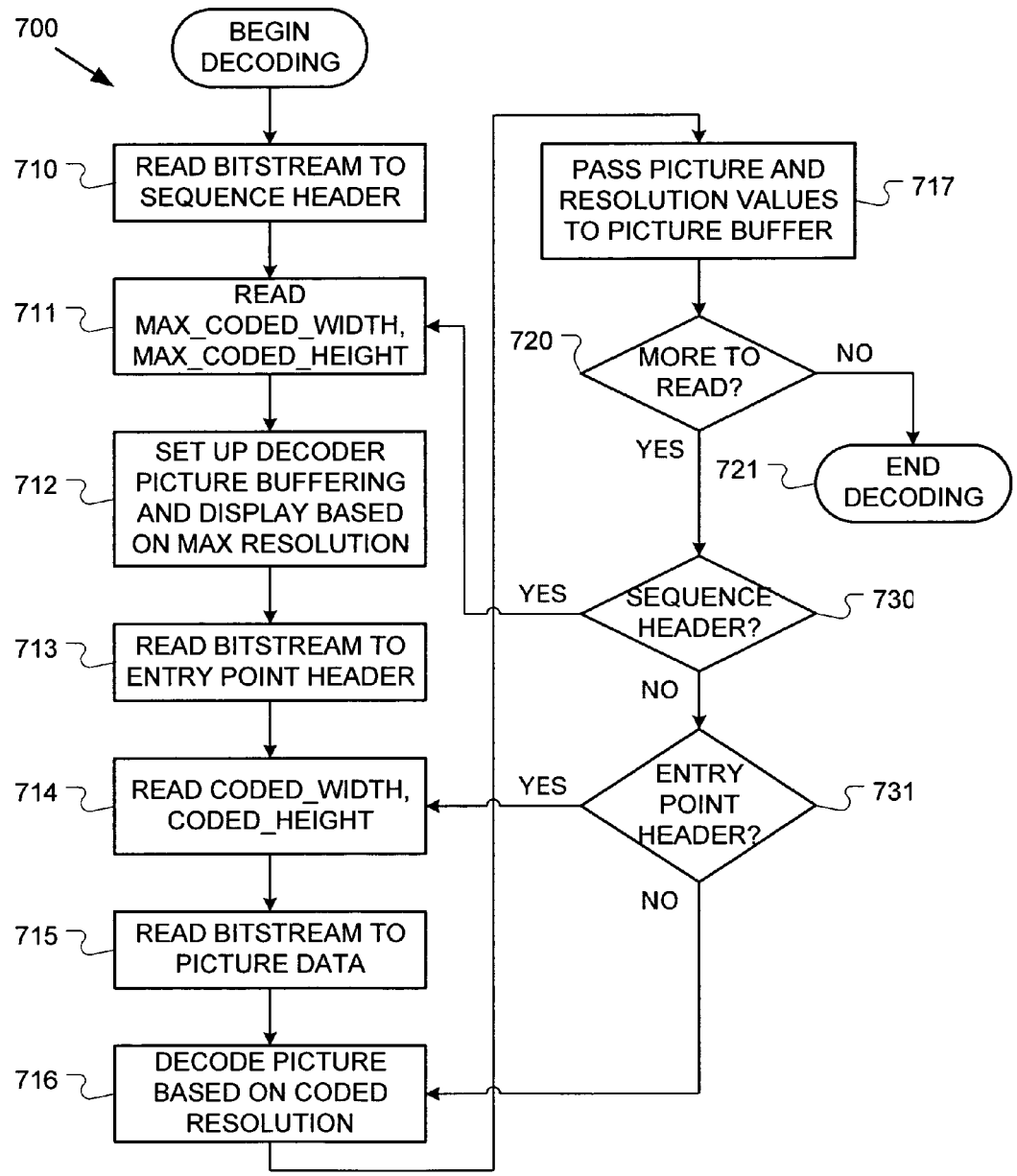
FIG. 7 is a flow diagram of a method utilized in the decoder of FIG. 3 for decoding a video sequence using variable coding resolution.
Figure 8:
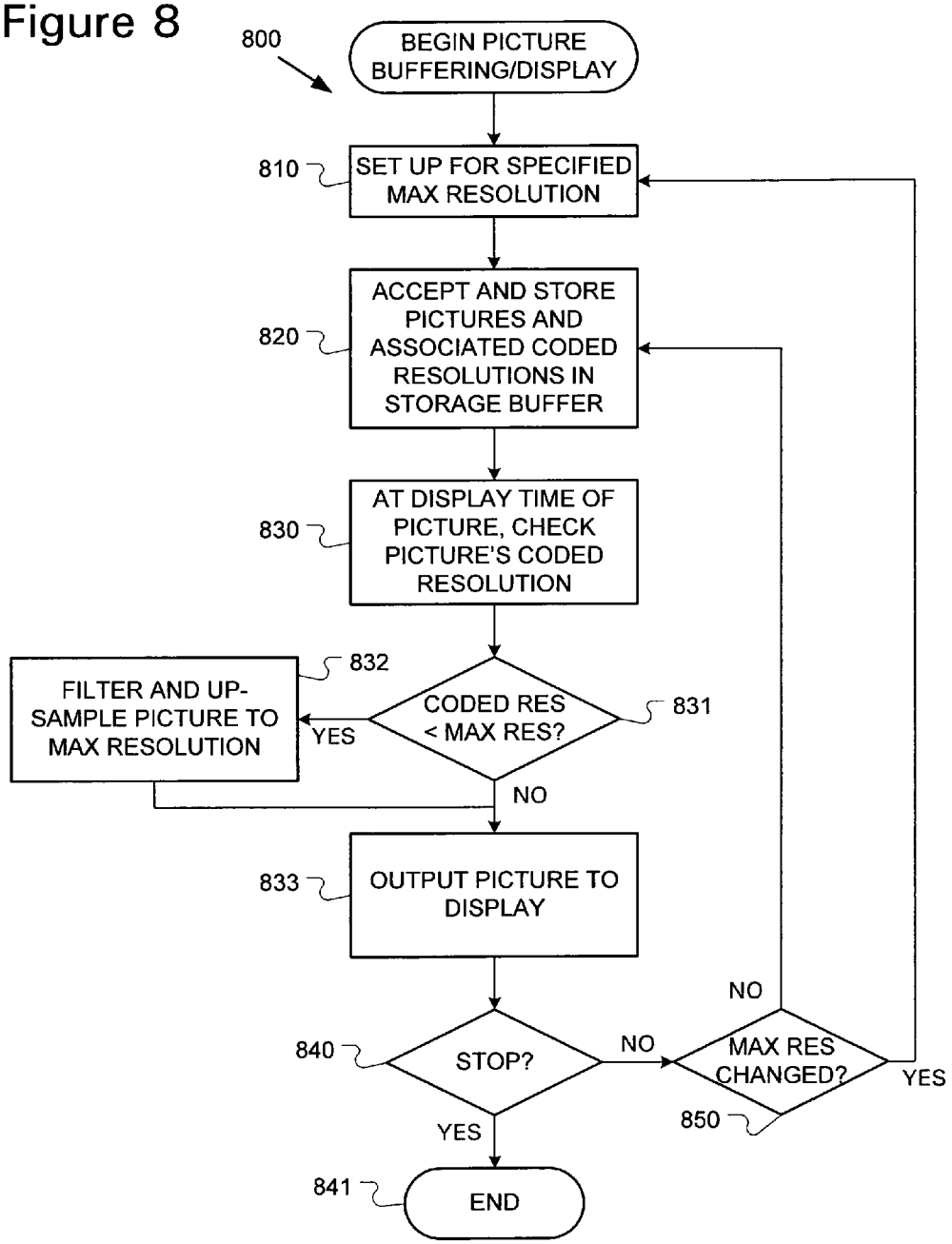
FIG. 8 is a flow diagram of a method utilized in the decoder of FIG. 3 for buffering and displaying the video sequence decoded by the method of FIG. 7.

FIGS. 7 and 8 show operations performed in the compression decoder 156 of the video player 150 (FIG. 1) to decode and display the compressed video sequence using variable coded resolution. The illustrated decoding process 700 and picture buffering and display process 800 is simplified to show those operations directly involved in the variable coded resolution technique. However, it should be understood to those skilled in the art that compression decoding of the video sequence involves many more operations as generally summarized above for the exemplary video decoder 300 (FIG. 3). The buffering and display process can be performed in the compression decoder, or by a separate resampler and display processor. Alternative implementations of the compression decoder can perform the variable coded resolution using fewer, more or a different arrangement of operations.

The compression decoder begins a decoding process 700 by reading the compressed video bit stream and finds the location of the sequence header (operation 710). The compression decoder then reads the maximum coded resolution from the MAX_CODED_WIDTH and MAX_CODED_HEIGHT syntax elements in the sequence header at operation 711. The compression decoder then sets up a picture buffering and display process 800 appropriately for the specified maximum coded resolution at operation 712.

The compression decoder then continues reading the bit stream up to an entry point header at operation 713. The compression decoder reads the coded resolution specified by the CODED_SIZE flag, CODED_WIDTH element and CODED_HEIGHT element at operation 714.

The compression decoder continues reading the bit stream and finds the location of a video picture at operation 715. At operation 716, the compression decoder proceeds to decode the picture based on the current coded resolution. For pictures that are B- or P-frames, the compression decoder uses the previously decoded picture(s) in the picture buffer. The compression decoder passes the decoded picture, along with values specifying its coded resolution to the decoded picture buffer where the decoded picture is stored for possible re-ordering and delay until the arrival of the display time for that picture.

The compression decoder then continues reading the bit stream, checking at operation 720 whether there are more pictures encoded in the bit stream. If there is no additional picture data, the compression decoder ends the decoding process 700 at operation 721. Otherwise, the compression decoder determines what information is next encoded in the bit stream. In the case of a further sequence header (operation 730), the compression decoder returns to reading the maximum coded resolution at operation 711. In the case of an entry point header (operation 731), the compression decoder returns to operation 714, reading the new coded resolution. Otherwise, the information is further picture data and the compression decoder decodes the picture based on the current coded resolution.

In the picture buffering and display process 800, the compression decoder sets up buffering for the specified maximum coded resolution at operation 810. At operation 820, the compression decoder accepts and stores pictures and their associated coded resolutions in the decoded picture buffer. Later, at display time of a picture, the compression decoder checks the picture's coded resolution at operation 830. If the picture's coded resolution is less than the maximum coded resolution at operation 831, the compression decoder filters and up-samples the picture to the maximum coded resolution 832. The compression decoder outputs the picture to the display at operation 833.

Finally, the compression decoder checks (840) whether the display operation is continuing (e.g., based on user input or end of the video sequence). If so, the compression decoder ceases operation at operation 841. Otherwise, the decoder checks (830) whether the maximum coded resolution is changed. If so, the decoder re-sets the picture buffering for the new maximum coded resolution at operation 810. Otherwise, the decoder returns to storing decoded pictures in the picture buffer.

5. Computing Environment

The above described implementations of the variable coding resolution techniques can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 9.

Figure 9:
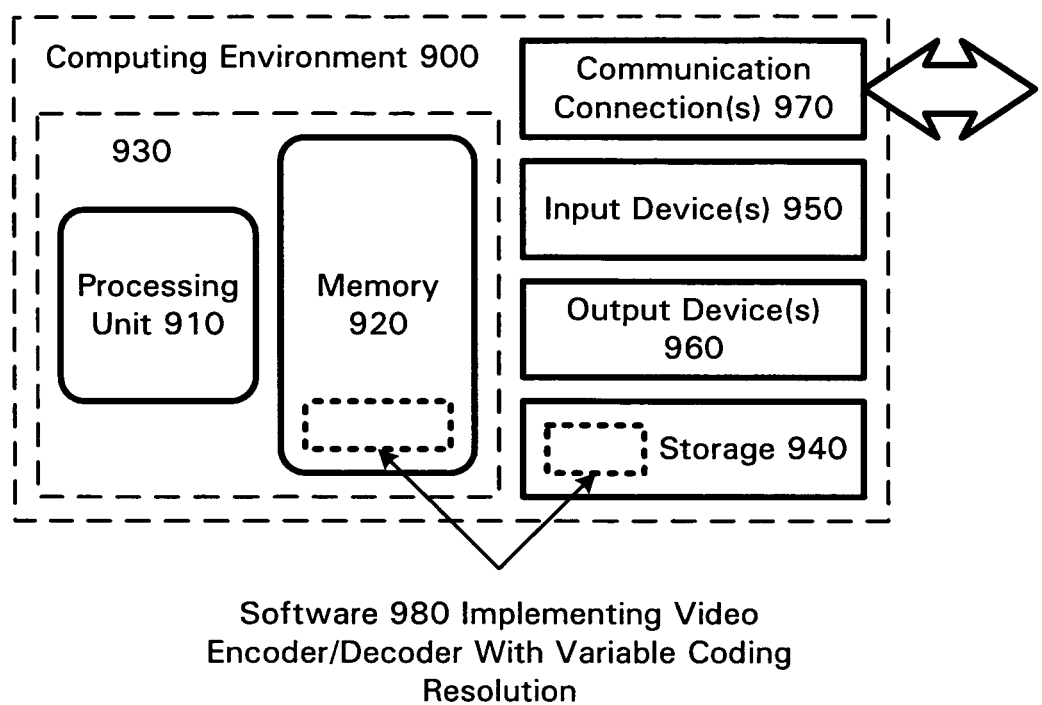
FIG. 9 is a block diagram of a suitable computing environment for the video encoder/decoder of FIGS. 2 and 3.

FIG. 9 illustrates a generalized example of a suitable computing environment (900) in which the described variable coding resolution techniques may be implemented. The computing environment (900) is not intended to suggest any limitation as to scope of use or functionality of the invention, as the present invention may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing the described variable coding resolution techniques.

A computing environment may have additional features. For example, the computing environment (900) includes storage (940), one or more input devices (950), one or more output devices (1060), and one or more communication connections (1070). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, CD-RWs, DVDs, or any other medium which can be used to store information and which can be accessed within the computing environment (900). The storage (940) stores instructions for the software (980) implementing the audio encoder that performs the variable coding resolution techniques.

The input device(s) (950) may be a touch input device such as a keyboard, mouse, pen, or trackball, a voice input device, a scanning device, or another device that provides input to the computing environment (900). For audio, the input device(s) (950) may be a sound card or similar device that accepts audio input in analog or digital form, or a CD-ROM reader that provides audio samples to the computing environment. The output device(s) (960) may be a display, printer, speaker, CD-writer, or another device that provides output from the computing environment (900).

The communication connection(s) (970) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The variable coding resolution techniques herein can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The variable coding resolution technique herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of decoding video coded using variable coded resolution, comprising, with a computing device that implements a video decoder:
  receiving a video bit stream, where a sequence header is integral to the video bit stream, the video bit stream having a plurality of entry point segments representing separate sub-sequences of pictures of a video sequence;
  decoding at least one syntax element from the sequence header, the least one syntax element from the sequence header specifying a maximum coded resolution for the video sequence;
  for a given one of the entry point segments, determining whether to use the maximum coded resolution for the video sequence as coded resolution for pictures of the given entry point segment and, if not, determining the coded resolution for the pictures of the given entry point segment by decoding at least one syntax element of an entry point header for the given entry point segment, the at least one syntax element of the entry point header specifying the coded resolution for the pictures of the given entry point segment;
  decoding said given entry point segment; and
  reconstructing at least part of the video sequence with the decoded entry point segment.

2. The method of claim 1, wherein the at least one syntax element specifying the maximum coded resolution are maximum coded width and height values.

3. The method of claim 2, wherein the maximum coded width and height values are binary coded values relating to width and height of the maximum coded resolution, respectively.

4. The method of claim 1, wherein the determining whether to use the maximum coded resolution is based on a flag in the entry point header for the given entry point segment, the flag being indicative of whether the pictures in the given entry point segment are encoded at a coded resolution lower than the maximum coded resolution.

5. The method of claim 1, wherein the at least one syntax element of the entry point header specifying the coded resolution comprises coded width and height values.

6. The method of claim 5, wherein the coded width and height values are binary coded values relating to width and height of the coded resolution, respectively.

7. The method of claim 1 wherein the coded resolution for the given entry point segment is lower than the maximum coded resolution, and wherein the given entry point segment includes an I picture at the coded resolution and one or more P pictures encoded using motion compensation at the coded resolution, the method further comprising:
  buffering the pictures of the decoded entry point segment at the coded resolution; and
  up-sampling the pictures of the decoded entry point segment.

8. The method of claim 1 wherein the at least one syntax element of the sequence header include first and second sequence-layer syntax elements indicating maximum coded width and maximum coded height, respectively, for the video sequence, and wherein the entry point header for the given entry point segment includes:
  a first entry point-layer syntax element indicating if the video bit stream includes the at least one syntax element specifying the coded resolution for the pictures of the given entry point segment; and
  if so, as the at least one syntax element specifying the coded resolution for the pictures of the given entry point segment, second and third entry point-layer syntax elements indicating coded width and coded height, respectively, for the pictures of the given entry point segment.

9. A computer system comprising a processor and memory, wherein the computer system implements a video player comprising:
  a demultiplexer configured to extract a video bit stream, where a sequence header is integral to the video bit stream;

a video decoder configured to:
read elements specifying a maximum coded resolution for a video sequence from the sequence header, the video sequence having a plurality of entry point segments for separate sub-sequences of pictures of the video sequence, each of the entry point segments being marked by a separate entry point and having at least one picture;
read a flag of an entry point header for a given one of the entry point segments in the video sequence, the flag indicating whether the at least one picture of the given entry point segment is encoded at a lower coded resolution;
read, from the entry point header for the given entry point segment, elements specifying the lower coded resolution for the at least one picture of the given entry point segment when indicated for the given entry point segment by the flag;
decode the at least one picture of the given entry point segment; and
up-sample the at least one picture of the given entry point segment from the lower coded resolution to the maximum coded resolution for the video sequence.

10. The computer system of claim 9, wherein the elements specifying the maximum coded resolution are width and height values.

11. The computer system of claim 9, wherein the elements specifying the lower coded resolution are width and height values.

12. The computer system of claim 9, further comprising:
a buffer, in the decoder, configured to buffer the at least one picture of the given entry point segment at the lower coded resolution for decoding any motion-compensated pictures without resampling of the buffered at least one picture.

13. The computer system of claim 9 wherein the elements of the sequence header include first and second sequence-layer syntax elements indicating maximum coded width and maximum coded height, respectively, for the video sequence, and wherein the elements of the entry point header for the given entry point segment include first and second entry point-layer syntax elements indicating coded width and coded height, respectively, for the pictures of the given entry point segment.

14. At least one computer-readable medium having a computer-executable instructions stored thereon that are executable by a processing unit to perform decoding of a video bit stream coded using variable coded resolution, the at least one computer-readable medium being selected from the group consisting of volatile memory, non-volatile memory, and magnetic disk, the decoding of the video bit stream comprising:
receiving a video bit stream, where a sequence header is integral to the video bit stream, the video bit stream having a plurality of entry point segments representing separate sub-sequences of pictures of a video sequence;
decoding at least one syntax element from the sequence header, the at least one syntax element from the sequence header specifying a maximum coded resolution for the video sequence;
for a given one of the entry point segments, determining whether to use the maximum coded resolution for the video sequence as coded resolution for pictures of the given entry point segment and, if not, determining the coded resolution for the pictures of the given entry point segment by decoding at least one syntax element of an entry point header for the given entry point segment, the at least one syntax element of the entry point header specifying the coded resolution for the pictures of the given entry point segment;
decoding said given entry point segment; and
in a case where the coded resolution for the pictures of the given entry point segment is lower than the maximum coded resolution, up-sampling the pictures of the given entry point segment to the maximum coded resolution for display of the video.

15. The at least one computer-readable medium of claim 14, wherein the at least one syntax element specifying the maximum coded resolution are maximum coded width and height values.

16. The at least one computer-readable medium of claim 15, wherein the maximum coded width and height values are binary coded values relating to width and height of the maximum coded resolution, respectively.

17. The at least one computer-readable medium of claim 14, wherein the determining whether to use the maximum coded resolution is based on a flag in the entry point header for the given entry point segment, the flag being indicative of whether the pictures in the given entry point segment are encoded at a coded resolution lower than the maximum coded resolution.

18. The at least one computer-readable medium of claim 14, wherein the at least one syntax element of the entry point header specifying the coded resolution comprises coded width and height values.

19. The at least one computer-readable medium of claim 18, wherein the coded width and height values are binary coded values relating to width and height of the coded resolution, respectively.

20. The at least one computer-readable medium of claim 14, wherein the coded resolution for the given entry point segment is lower than the maximum coded resolution, wherein the given entry point segment includes an I picture at the coded resolution and one or more P pictures encoded using motion compensation at the coded resolution, and wherein the decoding of the video bit stream further comprises:
buffering the pictures of the decoded entry point segment at the coded resolution.

21. The at least one computer-readable medium of claim 14 wherein the at least one syntax element of the sequence header include first and second sequence-layer syntax elements indicating maximum coded width and maximum coded height, respectively, for the video sequence, and wherein the entry point header for the given entry point segment includes:
a first entry point-layer syntax element indicating if the video bit stream includes the at least one syntax element specifying the coded resolution for the pictures of the given entry point segment; and
if so, as the at least one syntax element specifying the coded resolution for the pictures of the given entry point segment, second and third entry point-layer syntax elements indicating coded width and coded height, respectively, for the pictures of the given entry point segment.

* * * * *